United States Patent
Vetro et al.

(10) Patent No.: US 7,324,592 B2
(45) Date of Patent: Jan. 29, 2008

(54) RESOURCE-CONSTRAINED ENCODING OF MULTIPLE VIDEOS

(75) Inventors: Anthony Vetro, Cambridge, MA (US); Huifang Sun, Cambridge, MA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 933 days.

(21) Appl. No.: 10/639,951

(22) Filed: Aug. 13, 2003

(65) Prior Publication Data

US 2005/0036543 A1    Feb. 17, 2005

(51) Int. Cl.
*H04B 1/66* (2006.01)
*H04N 7/12* (2006.01)
*H04N 11/02* (2006.01)

(52) U.S. Cl. .................. 375/240.01; 725/95
(58) Field of Classification Search .......... 375/240.01; 725/95
See application file for complete search history.

(56) References Cited

U.S. PATENT DOCUMENTS

| | | | | |
|---|---|---|---|---|
| 5,068,724 A * | 11/1991 | Krause et al. | ......... | 375/240.16 |
| 5,969,764 A | 10/1999 | Sun et al. | ......... | 348/404 |
| 6,008,848 A | 12/1999 | Tiwari et al. | ......... | 348/409 |
| 6,052,384 A | 4/2000 | Huang et al. | ......... | 370/468 |
| 6,091,455 A | 7/2000 | Yang | ......... | 348/387 |
| 6,195,388 B1 | 2/2001 | Choi et al. | ......... | 375/240 |
| 6,275,536 B1 | 8/2001 | Chen et al. | ......... | 375/240 |
| 6,314,137 B1 | 11/2001 | Ono et al. | ......... | 375/240 |
| 6,940,903 B2 * | 9/2005 | Zhao et al. | ......... | 375/240.08 |
| 2002/0010938 A1 * | 1/2002 | Zhang et al. | ......... | 725/95 |
| 2003/0206717 A1 * | 11/2003 | Yogeshwar et al. | ......... | 386/69 |

OTHER PUBLICATIONS

Haskell in "Multiplexing of Variable Rate Encoded Streams," IEEE Transactions on Circuits and Systems for Video Technology, 1994.
Vetro, et al. in "An overview of video transcoding architectures and techniques," IEEE Signal Processing Magazine, Mar. 2003.
Wang et al, "Joint Rate Control for Multi-Program Video Coding," IEEE Transactions on Consumer Electronics, vol. 42, No. 3, Aug. 1996.
Wang, et al. "Survey of Compressed-Domain Features Used in Audio-Visual Indexing and Analysis," JVCIR, vol. 14, Issue 2, pp. 150-183, Jun. 2003.

* cited by examiner

*Primary Examiner*—Mehrdad Dastouri
*Assistant Examiner*—Jeremiah C Huber
(74) *Attorney, Agent, or Firm*—Dirk Brinkman; Clifton D Mueller; Gene V. Vinokur (57) ABSTRACT

A method acquires a plurality of input videos. The frames of each input video are acquired at a fixed sampling rate. Joint analysis is applied concurrently and in parallel to the input videos to determine a variable and non-uniform temporal sampling rate for each input video so that a combined distortion is minimized and a combined frame rate constraint is satisfied. Each input video is then sampled at the associated variable and non-uniform temporal sampling rate to produce output videos having variable temporal resolutions.

12 Claims, 8 Drawing Sheets

RESOURCE-CONSTRAINED ENCODING OF MULTIPLE VIDEOS

FIELD OF THE INVENTION

The invention relates generally to encoding multiple videos, and more particularly to the encoding the videos according to resource constraints.

BACKGROUND OF THE INVENTION

Encoding of multiple videos has been considered in two major areas: transmission and recording. Transmission of multiple videos is mainly applied in broadcasting and delivery applications, while recording of multiple videos is usually applied to surveillance applications. Although video recording is common in many consumer electronics products, such video recorders deal typically with the encoding of a single video, rather than multiple concurrent videos.

In television broadcasting applications, it is common practice to encode multiple videos, such that the encoded video bitstreams can be transmitted together over a single channel having a fixed bandwidth. For instance, given N programs and a total channel bandwidth of 45 Mbps, which is common for satellite links, the problem is to encode the N programs with an overall maximum quality, and multiplex them onto the single channel. Because the bandwidth is fixed and the complexity of each program varies, each of the programs is encoded at a variable bit-rate (VBR). In this way, a near-constant distortion can be maintained across all programs. Thus, more complex portions of one videos can be allocated more bits, by decreasing the bits allocated for less complex portions of other videos that are concurrently encoded.

The encoding process described above is referred to as statistical multiplexing. Techniques associated with this process are described by Haskell in "Multiplexing of Variable Rate Encoded Streams," IEEE Transactions on Circuits and Systems for Video Technology, 1994, Wang et al, "Multi-Program Video Coding with Joint Rate Control," U.S. Pat. No. 6,091,455, "Statistical Multiplexer for Recording Video," issued to Yang on Jul. 18, 2000, U.S. Pat. No. 6,195,388, "Apparatus and Method for Encoding Multiple Video Programs," issued to Choi et al. on Feb. 27, 2001, and references included therein.

Along similar lines, Sun and Vetro have described the encoding of multiple objects in a scene subject to a fixed bandwidth constraint in U.S. Pat. No. 5,969,764, issued on Oct. 19, 1999. That method allocates bits to each object. In U.S. patent application Ser. No. 09/579,889, "Method for encoding and transcoding multiple video objects with variable temporal resolution," filed by Vetro et al. on May 26, 2000, a method to satisfy a total bandwidth constraint with each object in a scene having a different temporal rate is described. There, the method minimizes composition artifacts that occur when multiple objects in a scene are encoded at different temporal rates.

The above prior art methods encode multiple videos or objects subject to a total bandwidth constraint of a single transmission channel.

In the prior art, resource constraints other than bandwidth have been considered in the processing of multiple videos, see for example, U.S. Pat. No. 6,052,384, "Using a Receiver Model to Multiplex Variable Bit-Rate Streams Having Timing Constraints," issued to Huang et al. on Apr. 18, 2000, which describes techniques to determine the output bit rates of each stream so that neither the queue for the bitstream in the multiplexer nor the buffer in a decoder overflows or underflows. The rates are determined using timing information that is read from the bitstream, and a receiver model that considers the operation of the decoder buffer.

Transcoding multiple videos considering timing, both delay and processing, constraints are described in U.S. Pat. No. 6,275,536, "Implementation architectures of a multi-channel MPEG video transcoder using multiple programmable processors," issued to Chen et al. on Aug. 14, 2001. Input bitstreams are first partitioned into processing units. In one architecture, the processing units are split into different substreams; each substream with its own queue, then each substream is processed in a corresponding branch. In a second architecture, the processing units are assigned to any available processor from a common queue. Independent processing units are processed concurrently according to a queuing system model to minimize an averaging processing time. In contrast to the first architecture that is a parallel process of multiple branches, the second architecture is a single branch to multi-processing.

Similar to Chen et al., U.S. Pat. No. 6,008,848, "Video Compression Using Multiple Computing Agents," issued to Tiwari et al., on Dec. 28, 2001 also describes a system and method that uses multiple processors. In contrast, Tiwari applies to encoding of a video and describes techniques to achieve the encoding using coarse grain parallelism effected by multiple processors or compressing agents.

Figure 1:
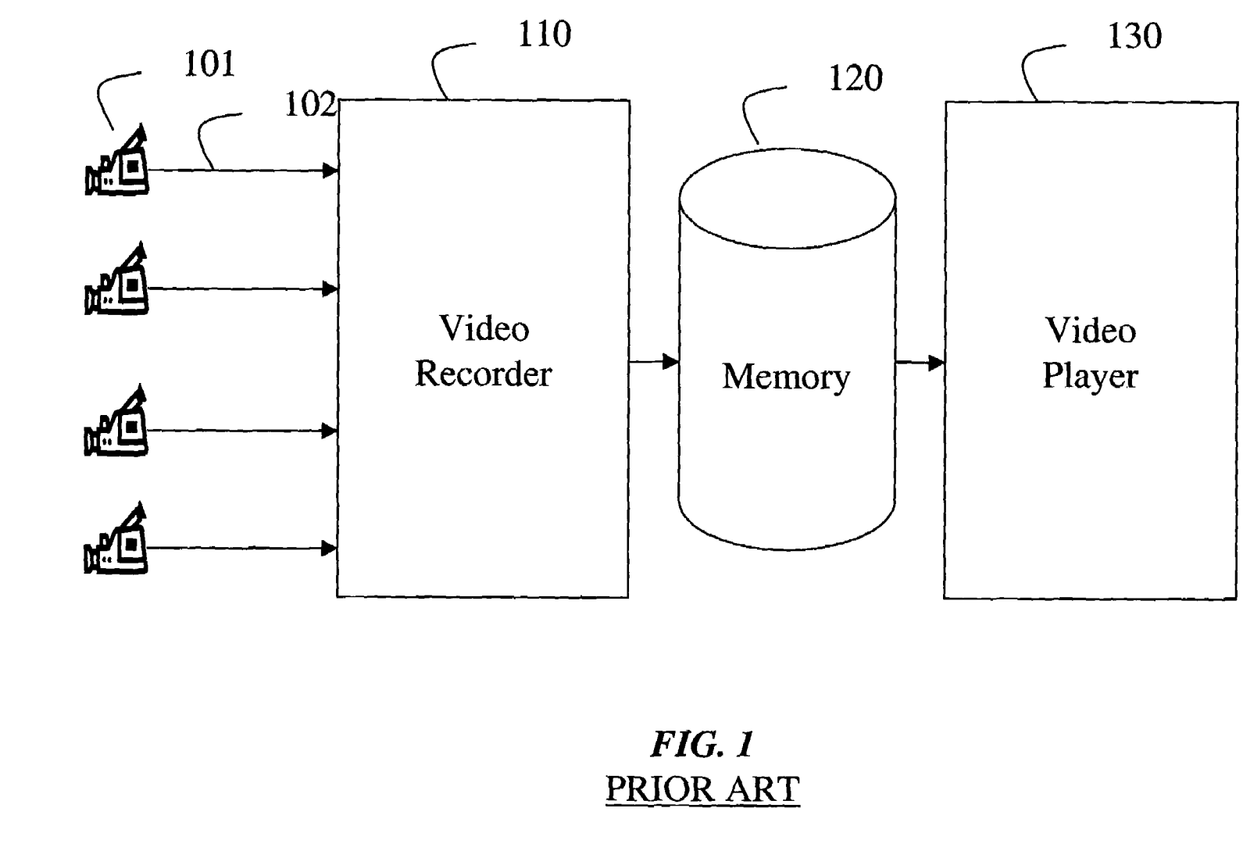
FIG. 1 is a block diagram of a prior art recording and playback system for multiple videos.

FIG. 1 shows a general system model for encoding multiple videos for a surveillance application. Cameras 101 acquire videos 102 for a video recorder 110. Typically, the recorder 110 compresses the videos. The compressed videos are then stored in a memory 120. Later, a video player 130 can play the stored videos.

Figure 2:
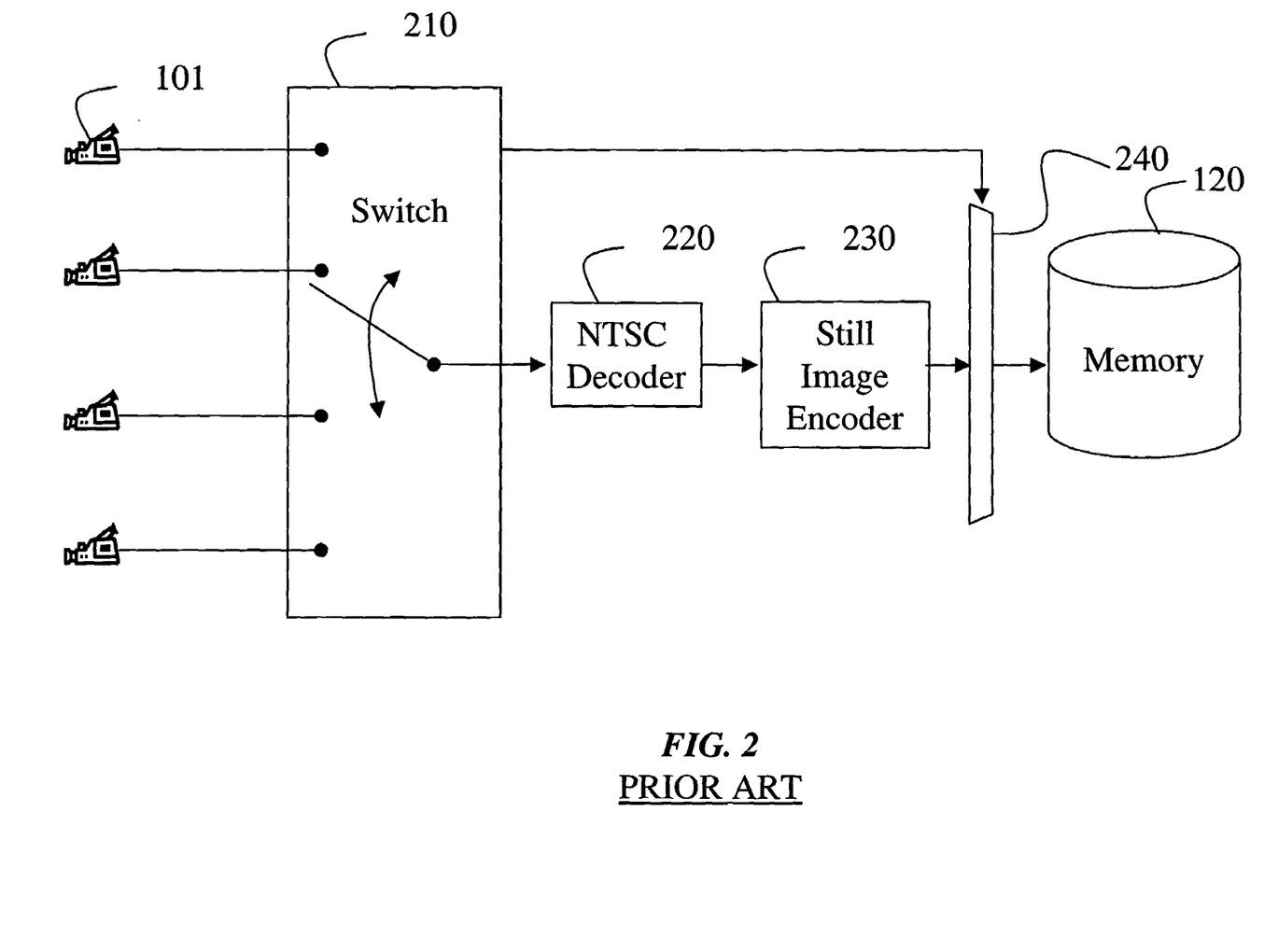
FIG. 2 is a block diagram of a prior art still image encoding system for multiple videos.

FIG. 2 shows the details of the recorder 200. The acquired videos 102 are sent to a high-speed switch 210. The switch samples the analog video signals in time. The samples are fed to a decoder 220, and the digitized images are encoded by a still-image-encoder 230 to yield compressed images. A memory controller 240 writes the compressed images to allocated space in the memory 120. The stored video can be played back later.

The main problem with the recorder of FIG. 2 is that still images are encoded. That does not exploit any temporal redundancy in the videos. As a result, the memory 120 needs to be very large if weeks and months of surveillance videos are stored. It should be noted that a huge amount of surveillance videos, particularly those taken at night, are of totally static scenes. Significant events are rare.

Figure 3:
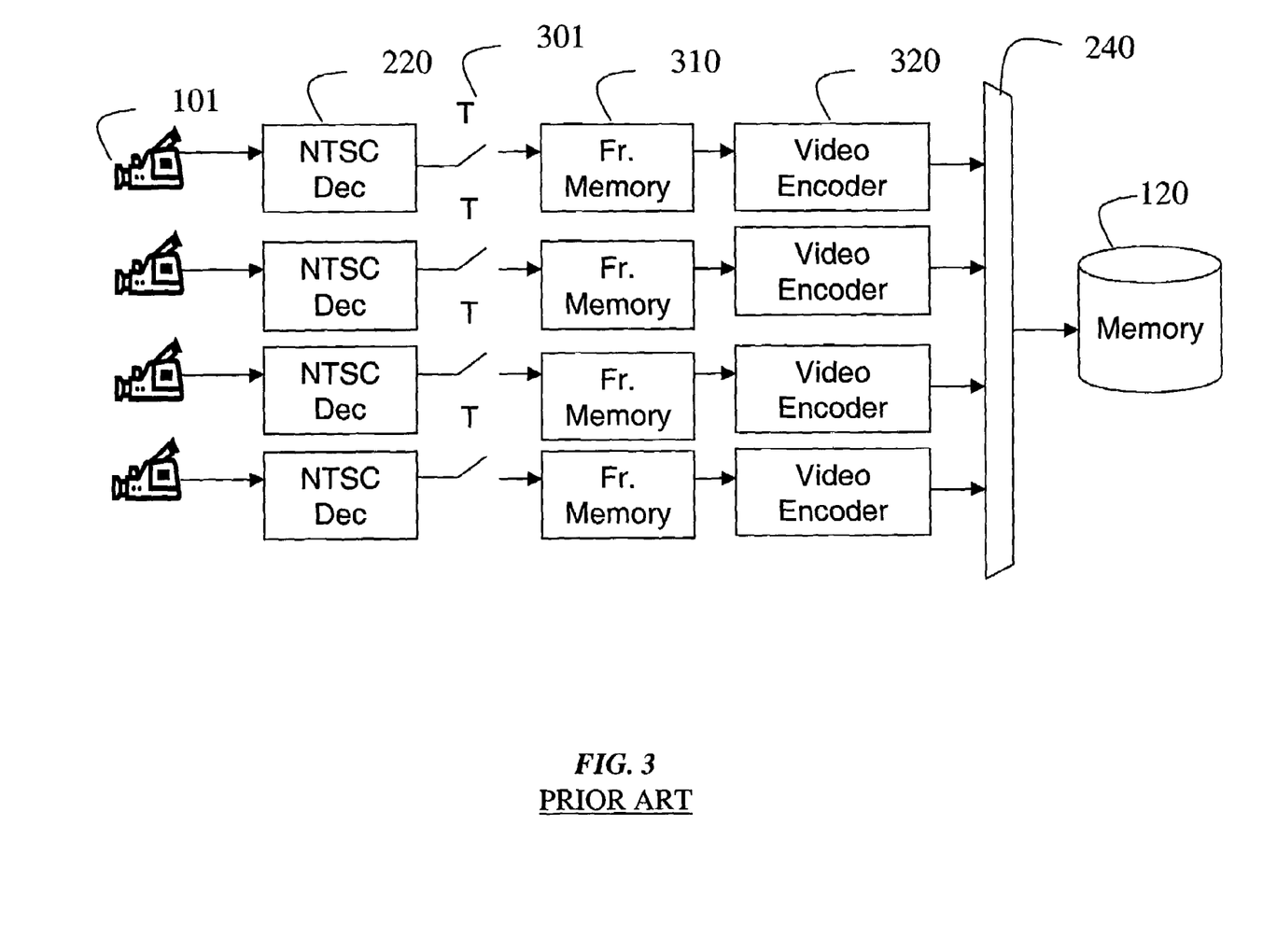
FIG. 3 is a block diagram of a prior art video encoding system for multiple videos that utilizes multiple encoders.

FIG. 3 shows an obvious solution to the above problem. In this scheme, there is one encoding channel for each video. In the encoding channel, the video is first NTSC decoded 220. Due to the predictive encoding used in video coders, such as MPEG, a frame memory 310 is maintained for each video encoder 320 to store reference pictures. The input frames from the different camera 101 are then encoded separately and the results are written to the memory 120 using the memory controller 240. The temporal rate of the input frames can be controlled by uniformly sampling with fixed period T 301. This sampling makes better utilization of the memory 120. The main drawbacks of that scheme are that the video encoders 320 are not fully utilized considering that they are typically designed to handle full-rate video. Also, the many decoders and encoders increase the cost of the system.

In U.S. Pat. No. 6,314,137, "Video data compression system, video recording/playback system, and video data compression encoding method," issued to Ono et al. on Nov.

Figure 4:
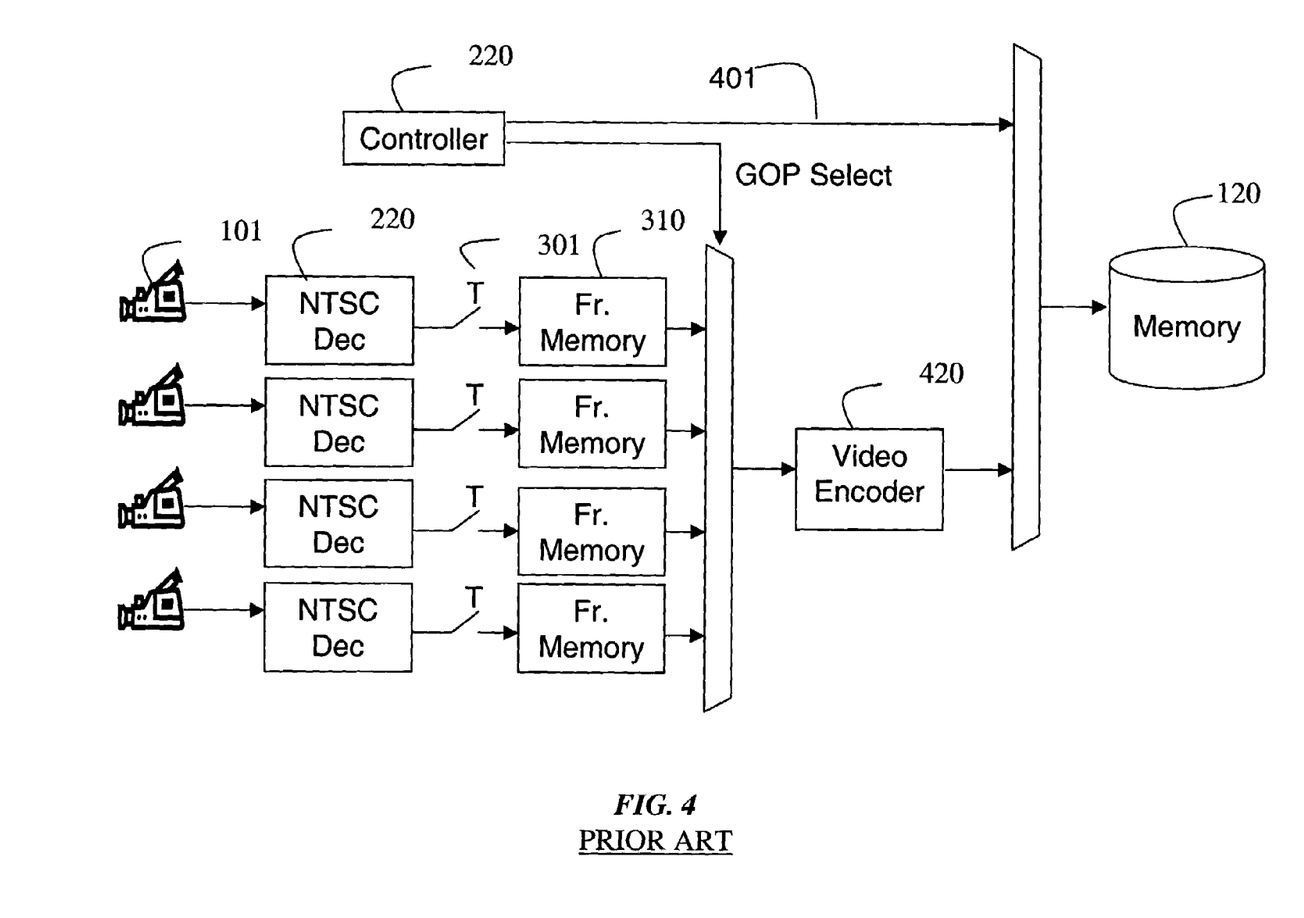
FIG. 4 is a block diagram of a prior art video encoding system for multiple videos that utilizes a single encoder.

6, 2001, a system and method that overcomes the above drawbacks is described, as shown in FIG. 4. There, a single video encoder 420 is used to encode all of the videos. The digitized video frames from each camera input 101 are sub-sampled with period T and buffered in the respective frame memories 210. In order to achieve the predictive encoding with the single encoder 420, a series of input video frames corresponding to one camera input are fed into the video encoder so that predictive coding from frames of the same camera input can be made successively. The Group of Pictures (GOP) structure in MPEG coding allows independent units of such to be formed. In that way, the memory controller 240 becomes a GOP-select, and the GOP's from each camera input are time-multiplexed into the encoder according to the controller 410. With that scheme, a single bitstream for all camera inputs is produced. To identify the portions of the videos that correspond to a given camera, a camera identifier 401 is multiplexed into the encoded bitstream.

With the above solution, one GOP's worth of data is required to be stored in each of the frame memories, which is a much larger requirement than the system of FIG. 2 that only requires 1 or 2 reference pictures, at most. Therefore, although there is a significant savings in encoding hardware, memory requirements are still large and expensive. This drawback cannot be overcome by simply sampling the input video more aggressively. Although this will reduce the temporal resolution of the video, the same data for a GOP still needs to be buffered. Only a shorter GOP period would reduce the memory requirements, but this would imply more frequent intra frame coding, which means less coding efficiency. In the most extreme case, a GOP period of 1 would degenerate to the still image coding system shown in FIG. 2.

High memory requirements are just one drawback of the system in FIG. 4. The problem becomes proportionately worse when the system is scaled to higher number of videos.

Therefore, it is desired to provide a system and method for concurrently encoding multiple videos.

SUMMARY OF THE INVENTION

One object of the invention is to provide a low-cost, compression-efficient, scalable and flexible system for encoding multiple videos with constrained resources, particularly memory, encoding hardware, and delay.

A further object of the invention is to provide a method for achieving variable and non-uniform temporal resolution among multiple uncorrelated videos.

A method acquires a plurality of input videos. The frames of each input video are acquired at a fixed sampling rate.

Joint analysis is applied concurrently and in parallel to the input videos to determine a variable and non-uniform temporal sampling rate for each input video so that a combined distortion is minimized and a combined frame rate constraint is satisfied.

Each input video is then sampled at the associated variable and non-uniform temporal sampling rate to produce output videos having variable temporal resolutions.

DETAILED DESCRIPTION OF THE PREFERRED EMBODIMENT

Figure 5:
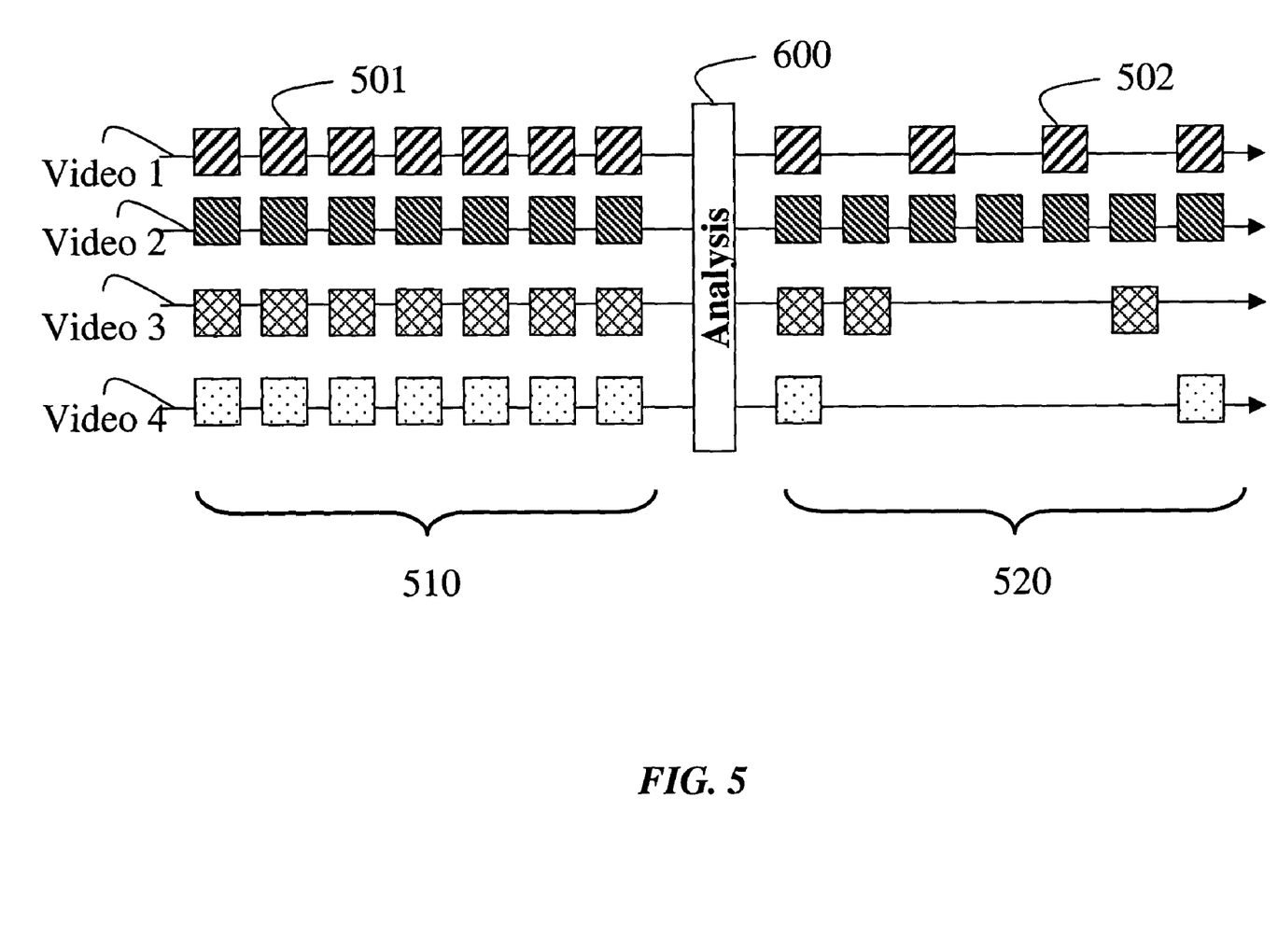
FIG. 5 is a block diagram of concurrent full frame rate input videos analyzed to produce output videos with non-uniform temporal resolution according to the invention.

FIG. 5 shows individual frames 501 of multiple input videos (videos 1-4) 510 acquired concurrently with a camera at fixed sampling rates. Subject to joint analysis 600 according to our invention, frames 502 of multiple output videos 520 have a variable and non-uniform temporal sampling rates. The objective of the joint analysis is to minimize a combined distortion for all output videos, while a combined frame rate constraint is satisfied.

Factors affecting the rate and presence of a particular output frame 502 at a given time include compression efficiency, resource constraints, and significant event detection. Compression efficiency can relate to the type encoder that is used, e.g., MPEG-2 or MPEG-4. Resource constraints consider memory, processing speed, and encoding rates. By significant events, we mean short-term local events that are different from longer portion of the underlying scene.

For example, in a surveillance video, a person entering an otherwise static scene of an empty hall way is deemed significant, see U.S. patent application Ser. No. 10/610,467, "Method for Detecting Short Term Unusual Events in Videos," filed by Divakaran et al. on Jun. 30, 2003, incorporated herein by reference. Similarly, for a traffic video, a change from smooth motion to no motion can be indicative of an accident.

System Architectures

Figure 6A:
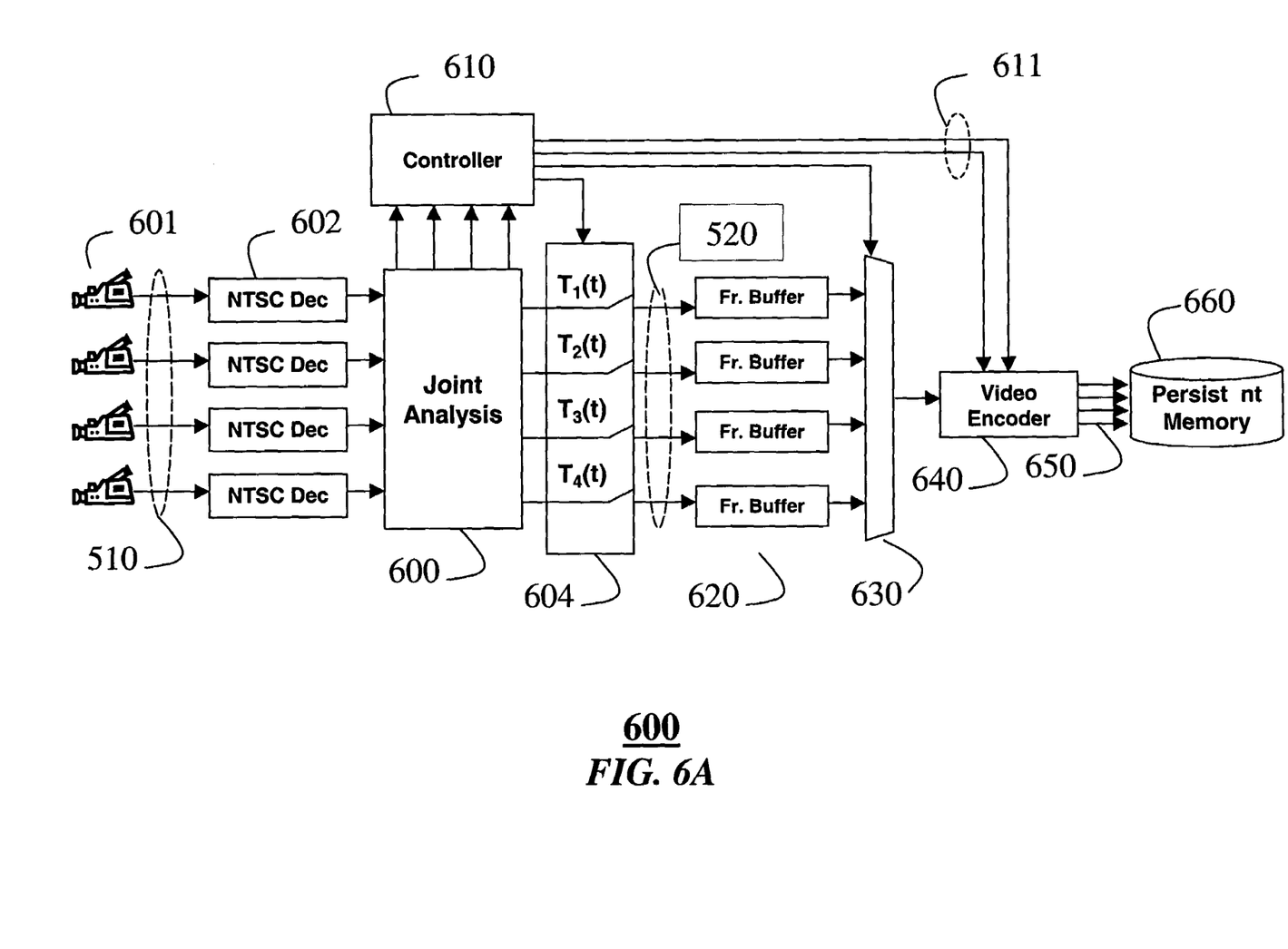
FIG. 6A is a video encoding system for multiple videos that utilizes a single encoder and individual memories in accordance with the invention.

FIG. 6A shows a block diagram of a video encoding system for multiple videos in accordance with our invention. The videos 510 from multiple camera 601 are first NTSC decoded 602. The digitized videos are then input to the joint analysis circuit 600 to determine a temporal sampling rate 604 for each video.

The temporal sampling rate 604 is determined according to a method that considers the presence of significant events in the video, compression efficiency and resource constraints. The method and constraints are described in greater detail below.

The variable and non-uniform temporal sampling rate for each video is passed to a controller 610, which triggers the sampling circuit 604. This circuit is capable of non-uniformly sampling frames of each video input at time t. The sampling times $T_1(t)$, $T_2(t)$, $T_3(t)$ and $T_4(t)$ do not necessarily operate at the same rate as one another. These sampling times determine the combined frame rate across all videos.

The frames of the sampled videos 520 are then stored in a frame buffer 620. The controller 610 selects 630 the input to be encoded 640, and the frames are read from the respective frame buffers and passed to a video encoder 640. From the controller, the video encoder can receive the following information 611: coding parameters to be used for encoding the video that were derived by the joint analysis 600, and identification information that can also be encoded in the bitstream itself. The identification can be encoded directly in the bitstream using an MPEG-4 video object plane coding syntax described in ISO/IEC 14496-2, "Coding of audio-visual objects—Part 2: Visual," $2^{nd}$ Edition, 2001.

The system produces a unique bitstream 650 for each video input, which is then stored to a persistent memory 660 for later playback.

With this system, a minimal number of reference frames are stored for each video, typically one or two frames. The reason for this low memory requirement is due to the nature of the video encoding process. In contrast to the prior art system by Ono, et al. shown in FIG. 4, which encodes GOP's of data, the system according to this invention encodes frames of data. This is enabled through the video encoder 640 that can mark the different video inputs and produce independent output bitstreams 650. The controller 610 can select 630 the correct reference frames to be used for motion compensation of the current video being encoded. Neither of these features are part of the system described by Ono, et al. These features can provide a scalable system for encoding concurrently multiple videos.

Figure 6B:
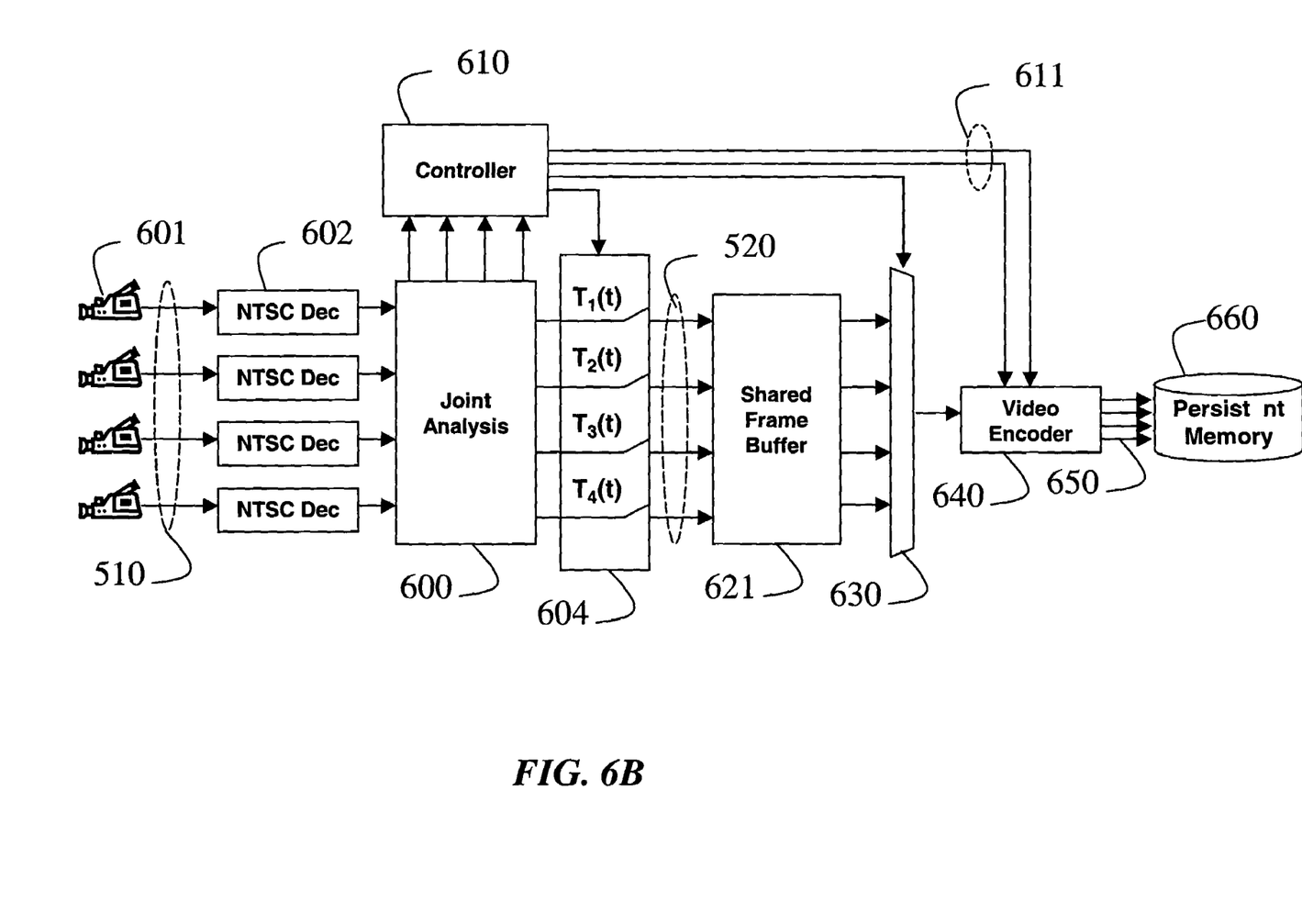
FIG. 6B is a video encoding system for multiple videos that utilizes a single encoder and shared memory in accordance with the invention.

The system in FIG. 6B is a slightly different configuration of the system in FIG. 6A. The main difference is a single shared frame buffer 621.

Figure 7:
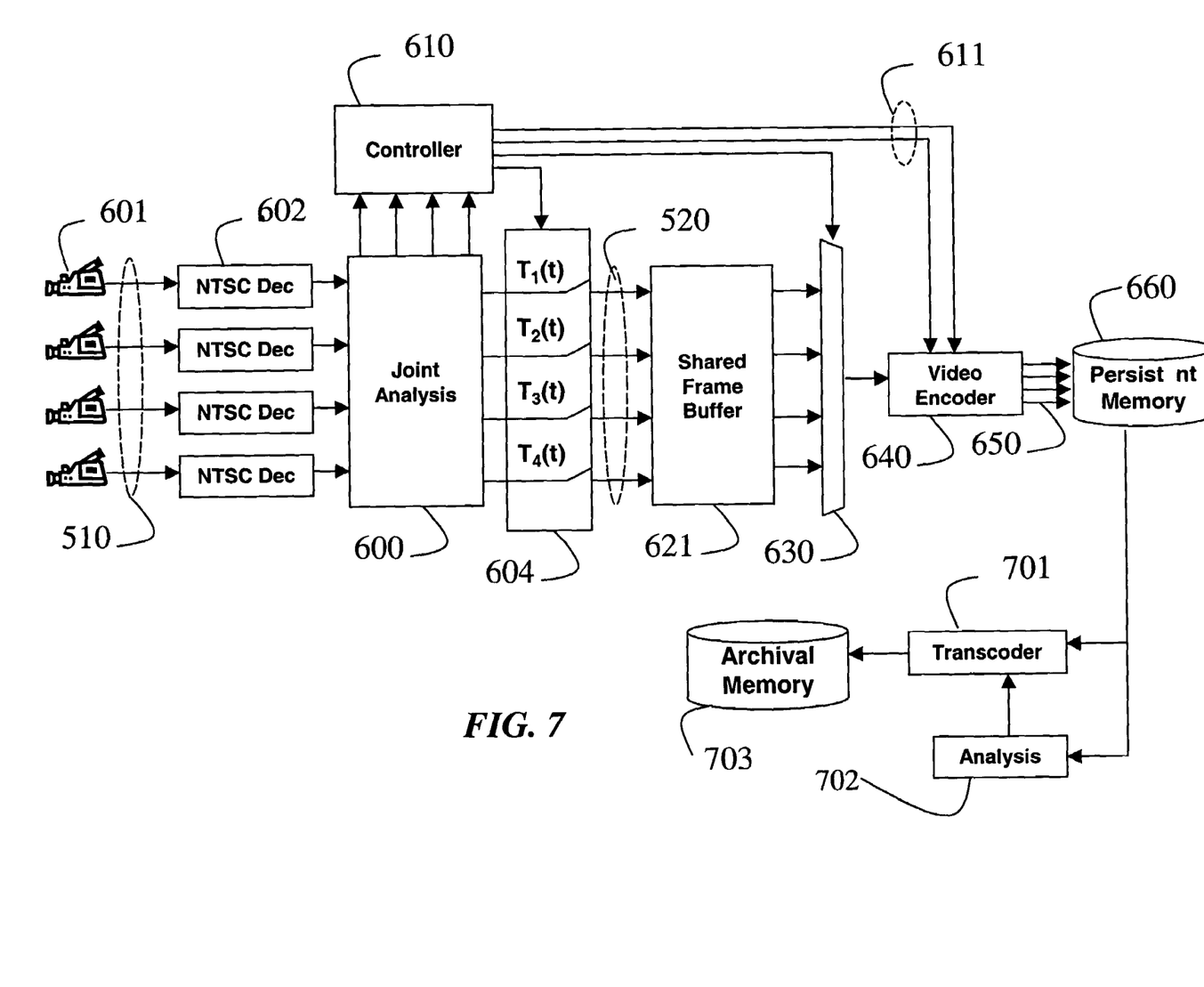
FIG. 7 is a block diagram of a video encoding system for multiple videos that utilizes a single encoder and transcoder in accordance with the invention.

FIG. 7 shows an extension of the core architectures of FIGS. 6A and 6B. The bitstreams stored in the persistent memory 660 can be transferred to an archival memory 703 for long-term storage. In this case, a transcoder 701 can be employed to further modify the bit rate, spatial resolution and/or temporal resolution of the stored bitstream. An analysis circuit 702 is used to configure and set the transcoding parameters. Any prior art transcoding techniques may be used, such as those described by Vetro, et al. in "An overview of video transcoding architectures and techniques," IEEE Signal Processing Magazine, March 2003.

Although the above architectures are shown for four input videos and one video encoder, this design allows the system to easily be scaled up to a greater number of input videos and video encoders, e.g., 16 inputs and 2 video encoders, or 64 inputs and 4 video encoders.

Joint Analysis

The factors affecting the operation of the joint analysis 603 include: a combined distortion incurred by skipping frames, the number of encoders integrated as part of the system, the number of input videos, the detection and classification of significant events in a scene, users preference to a particular camera input, a minimum temporal coding rate for each video, the allowable delay and required storage for analysis.

The combined distortion that is incurred by skipped frames guides the operation of the joint analysis. In U.S. patent application Ser. No. 09/835,650 "Estimating Total Average Distortion in a Video with Variable Frameskip," filed by Vetro et al. on Apr. 16, 2001. The distortion of a skipped frame is determined from two parts: a coding error due to quantization of the last reference frame, and a frame interpolation error due to the change in the video signal between the two time instants. That method only considers distortion in a single video. Here, the total combined distortion of all output video is minimized.

In the following, we refer to the distortion caused by the coding error as the spatial distortion, and the distortion caused by the interpolation error as the temporal distortion. Because video recording systems typically encode all frames at the same quality, the problem of estimating distortion can exclude the spatial distortion of frames and focus only on the temporal distortion. It is emphasized that this is quite different from any formulation that has been considered in the prior art.

The number of encoders that are integrated as part of the system determines the combined frame rate, i.e., the maximum number of frames that can be encoded per unit time. For instance, if a single encoder can encode 30 frames per second and there are four encoders integrated as part of the system, then the combined frame rate is 120 frames/second. For example, the combined frame rate can be allocated over the video as follows. Sixty surveillance video of static scenes can be sampled at 1 one frame per second each, while two video with activity can be sampled at 30 frames per second, for a total combined frame rate of 120 fps.

For the purpose of formulating a problem based on this constraint, a value $N_{cap}(T)$ denotes the total number of frames per unit of time T. Depending on the number of input videos to the system and the frame rate of those videos, the average temporal sampling rate across all videos can be determined.

The objective function for the joint analysis can be stated as follows:

$$\min \sum_i D_i \text{ such that } N_{coded}(T) \le N_{cap}(T) \qquad (1)$$

where $D_i$ is the temporal distortion of video i, and $N_{coded}(T)$ is the total number of frames to be coded per unit of time T. To maximize the utilization of the encoding capability, $N_{coded}(T)=N_{cap}(T)$.

The temporal distortion from (1) in a time interval [t, t+τ] is expressed as follows:

$$D_i[t, t+\tau]=w_i \Sigma D_{skipped\_frames}[t, t+\tau] \qquad (2)$$

The above equations sum the distortion of skipped frames in the given time interval and considers a multiplicative weighting factor for each video, $w_i$. The purpose of this weighting, and factors that influence the weight values are described below.

As stated earlier, this formulation is novel in that only the temporal distortion is accounted for, but it is also novel in that there are no rate constraints for individual videos, as is very typical in formulations in the prior art. rather, there is a constraint on the combined frame rate for all videos. This is the second novel aspect of this formulation, and to our knowledge, this feature does not appear in any prior art systems.

The detection of a significant event in the scene could imply a binary operation to record whether the event has been detected, and cease recording if there is no significant event. This is quite a simple operation. However, unless the detector is very accurate and robust to noise, this is not a very good strategy because there is a chance that some significant events could be missed, and that some insignificant events will be recorded.

Rather, it is preferred to include a weighting factor as part of the above objective function to be optimized. Given that the objective function is based on minimizing the combined distortion, we employ a weight of unity when there is no significant event, and a larger weight, e.g., $w_i=w_{max}$, when there is an event. The value of $w_{max}$ is adjustable. Large values encourage the joint analysis to code more frames in the video in which an event has been detected in order to minimize the combined distortion. When there is no event detected and $w_i=1$, the default mode is for the objective function to rely purely on the distortion of a video to determine the coded frames. The weight, $w_i$, can take on values in the range $[1, w_{max}]$ given that the process used for event detection has the ability to distinguish the degree of significance for different events.

An additional use of the weight, $w_i$, in the formulation of (1) is to express the preference of a particular video. For instance, if a video is of a critical area, e.g., an entry way, then $w_i$ may be set larger than one. Similar to the detection of an event, this gives bias to always encode more frames from this input video. Note, the preference can also operate on the weighting that results from the event detection. In other words, the preference can add a constant value to the weight that is output from the event detection process.

Rather than adding preference for a video, the weight can also be used to reduce the emphasis on a relative number of frames to be coded for a particular video. This can be achieved with weights less than one. The reason is that the distortion incurred by skipping frames from that input video accumulates slower, and fewer frames are coded.

However, there can be a minimum temporal coding rate that is set by the system. This setting forces a frame to be coded for a particular input after some predetermined period has elapsed since the last frame was encoded. Setting the weight to zero for a particular input always force this minimum temporal rate.

The final factor influencing the operation of the joint analysis 603 is the allowable delay ($\tau$). If a larger delay can be tolerated, then the problem is solved considering a larger interval of time. Although lower distortions are possible with a larger time interval, there are two drawbacks to having this larger time interval. The first drawback is memory size. A larger window of time implies that more storage is needed to analyze incoming frames. The second drawback is computation. For a larger window of time, there are more possible solutions that need to be evaluated. This is a typical engineering trade-off that needs to be made during the system design. However, we note the flexibility that the system described by this invention offers.

Breaking the problem down into a fixed time interval, T, and letting N denote the combined total number of possible frames that are encoded in this time interval for all input videos, the optimal solution to the above stated problem requires the system to evaluate $$\binom{N}{N_{cap}}$$

possible solutions.

The solution with the minimum combined distortion over all videos for the given time interval is selected. It should be noted that each of the possible solutions is a combination of distortion calculations between two frames. If M is total number of input videos and K is the total number of frames within the period T for each video, then the total number of distinct distortions between pairs of frame that need to be calculated is $$M \times \binom{K}{2}.$$

Although the invention has been described by way of examples of preferred embodiments, it is to be understood that various other adaptations and modifications can be made within the spirit and scope of the invention. Therefore, it is the object of the appended claims to cover all such variations and modifications as come within the true spirit and scope of the invention.

We claim:

1. A method for encoding a plurality of videos, comprising:
   acquiring a plurality of input videos, in which frames of each input video are acquired at a fixed sampling rate;
   applying concurrently and in parallel joint analysis to the plurality of input videos to determine a variable and non-uniform temporal sampling rate for each input video, so that a combined distortion is minimized and a combined frame rate constraint is satisfied, and in which the joint analysis minimizes an objective function $$\min \sum_i D_i \text{ such that } N_{coded}(T) \le N_{cap}(T),$$

where $D_i$ is the combined distortion of video i, $N_{coded}(T)$ is a current frame rate, and $N_{cap}(T)$ is the combined frame rate expressed as a total number of frames that can be coded per unit of time T, and in which the value of $N_{cap}(T)$ is determined according to the number of video encoders and a maximum frame rate of each encoder; and
   sampling frames of each input video at the associated variable and non-uniform temporal sampling rate to produce a plurality of output videos having variable temporal resolutions.

2. The method of claim 1, in which the joint analysis considers significant events in each video, compression efficiency, and resource constraints.

3. The method of claim 1, in which frames of each output video are stored in an associated frame buffer, and further comprising:
   encoding the frames of each video as a bitstream with a number of encoders that is substantially less than the number of input videos.

4. The method of claim 3, in which the bitstreams are stored in a persistent memory for playback.

5. The method of claim 4, further comprising:
   analyzing the bitstreams stored in the persistent memory;
   transcoding the bitstreams according to the analysis to modify a bit rate, spatial resolution and temporal resolution of the stored bitstreams; and
   storing the transcoded bitstreams in an archival memory.

6. The method of claim 3, in which the combined frame rate is a sum of all frame rates of all of the encoders.

7. The method of claim 1, in which the combined distortion is a temporal distortion.

8. The method of claim 7, in which the temporal distortion in a time interval $[t, t+\tau]$ is $$D_i[t, t+\tau] = w_i \Sigma D_{skipped\_frames}[t, t+\tau]$$

where $D_{skipped\_frames}$ denotes a number of frames skipped during the sampling of the input videos, $w_i$ is a weighting factor for video i, and $\tau$ is a predetermined delay.

9. The method of claim 8, in which the weight for a video is determined according to user preference.

10. The method of claim 8, in which the weight for a video is determined according to an event detection method.

11. The method of claim 8, in which the weight is less than one to skip more frames in the input video, and greater than one to skipped fewer frames in the input video.

12. The method of claim 1, in which the joint analysis is subject to a constraint on the minimum temporal rate for a video.

* * * * *